US005393612A

United States Patent [19]

Matsuura et al.

[11] Patent Number: 5,393,612

[45] Date of Patent: Feb. 28, 1995

[54] INSULATED WIRE

[75] Inventors: Yuki Matsuura; Isao Ueoka, both of Osaka; Koichi Iwata, Kobe; Hiromitsu Kawabe, Kariya; Yoshitaka Natsume, Nagoya, all of Japan

[73] Assignees: Sumitomo Electric Industries, Ltd., Osaka; Nippondenso Co., Ltd., Kariya, both of Japan

[21] Appl. No.: 171,458

[22] Filed: Dec. 22, 1993

[30] Foreign Application Priority Data

Dec. 22, 1992 [JP] Japan .................................. 4-342728

[51] Int. Cl.$^6$ .................................................. B32B 15/08

[52] U.S. Cl. ....................................... 428/458; 524/401; 524/404; 524/413; 524/423; 524/433; 524/437; 524/442; 428/473.5; 428/474.4; 428/620; 428/626; 428/627; 428/423.1

[58] Field of Search ................ 524/401, 404, 413, 423, 524/433, 437, 442; 428/620, 626, 627, 423.1, 458, 473.5, 474.4

[56] References Cited

U.S. PATENT DOCUMENTS

| | | | |
|---|---|---|---|
| 4,451,306 | 5/1984 | Verne | 156/51 |
| 4,985,313 | 1/1991 | Penneck et al. | 428/627 |
| 5,209,987 | 5/1993 | Penneck et al. | 428/610 |

FOREIGN PATENT DOCUMENTS

| | | |
|---|---|---|
| 386123 | 10/1960 | Japan . |
| 44-19274 | 8/1969 | Japan . |
| 45-27611 | 9/1970 | Japan . |
| 62-48726 | 3/1987 | Japan . |

*Primary Examiner*—Samuel A. Acquah
*Attorney, Agent, or Firm*—Cushman, Darby & Cushman

[57] ABSTRACT

An insulated wire comprising a conductor and an insulating coating which has a tensile strength of at least 13 $kg/mm^2$ and a Young's modulus of at least 270 $kg/mm^2$, which has good flexibility and resistance to flaw.

26 Claims, 1 Drawing Sheet

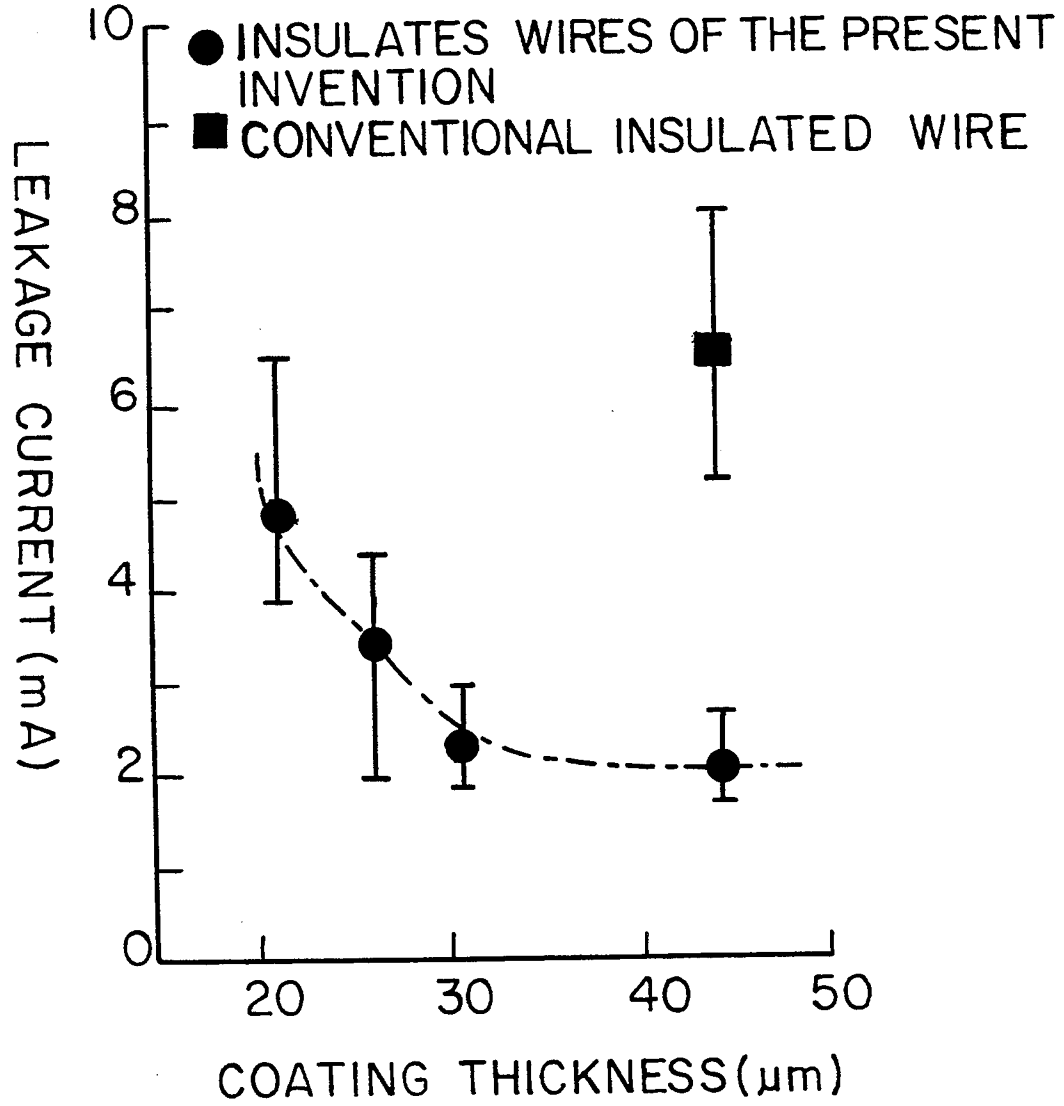
INSULATES WIRES OF THE PRESENT INVENTION
CONVENTIONAL INSULATED WIRE
LEAKAGE CURRENT (mA)
COATING THICKNESS (μm)
0
2
4
6
8
10
20
30
40
50

INSULATED WIRE

BACKGROUND OF THE INVENTION

1. Field of the Invention

The present invention relates to an insulated wire. More particularly, the present invention relates to an insulated wire which is excellent in winding and inserting property in processing and preferably used as a wire to be wound around a core of a motor.

2. Description of the Related Art

In these years, as an tendency for down-sizing and weight reduction of electric and electronic apparatuses has increased, a smaller and lighter motor with higher performances has been required. To satisfy such requirement, it is necessary to wind more turns of an insulated wire around the core of the motor. To this end, the insulated wire is forced to be jammed in a core slot. Therefore, an insulating coating of the insulated wire tends to be damaged during winding. If the insulating coating is damaged, layer failure or earth failure occurs so that electric characteristics of the motor tend to be deteriorated.

Hitherto, in the motor to be used in the above described application, there is usually used an insulated wire having an insulating coating with good mechanical strength which is formed by coating and baking a coating paint of polyamideimide on a conductor or other insulating coating which is already formed on the conductor. As the polyamideimide, a reaction product of diphenylmethane-4,4'-diisocyanate and trimellitic anhydride is generally used (cf. Japanese Patent Publication Nos. 19274/1969 and 27611/1970).

Today, a further down-sized and weight reduced motor with better performances is required. To satisfy this requirement, the number of turns of the insulated wire is further increased so that even the polyamideimide base insulating coating is sometimes damaged.

To decrease the damage of the insulating coating, it is studied to add an organic or inorganic lubricant to the coating paint so as to impart lubricity to the insulating coating surface. However, this method cannot completely prevent damage of the insulating coating.

The further increase of the mechanical strength of the insulating coating may decrease the damage of the insulating coating. However, simple increase of the mechanical strength will make the coating more stiff and less flexible, so that the coating is easily cracked or peeled off when the insulated wire is bent, or the winding and inserting properties of the insulated wire are deteriorated.

SUMMARY OF THE INVENTION

One object of the present invention is to provide an insulating coating of an electric wire which is less damaged than the conventional coating.

Another object of the present invention is to provide an insulated wire having improved flexibility and processability.

According to the present invention, there is provided an insulated wire comprising a conductor and an insulating coating which has a tensile strength of at least 13 $kg/mm^2$ and a modulus in tension (Young's modulus) of at least 270 $kg/mm^2$.

BRIEF DESCRIPTION OF THE DRAWING

The FIGURE is a graph showing the leakage currents of the stator coils produced in Example 9.

DETAILED DESCRIPTION OF THE INVENTION

To provide an insulated wire which can solve the problems of the conventional insulated wires, a mechanism of generation of processing flaws and a relationship between physical properties of the insulating coating and the processing flaws were investigated. As the result, the following has been found:

a) Due to friction between the insulated wire and another insulated wire or a metal jig during insertion of the wire, a shear force is exerted on the coating as soon as the insulated wire is inserted, whereby the processing flaws are formed, and b) Accordingly, the tensile strength and Young's modulus of the insulating coating are important to prevent the formation of processing flaws.

Then, to impart practical flaw resistance to the insulating coating, ranges of the tensile strength and Young's modulus have been investigated. Consequently, it has been found that an insulated wire with good flexibility and processability which is coated by the insulating coating having good resistance to flaw can be produced, when the insulating coating has the tensile strength of at least 13 $kg/mm^2$ and the Young's modulus of at least 270 $kg/mm^2$.

When the tensile strength is less than 13 $kg/mm^2$ or the Young's modulus is less than 270 $kg/mm^2$, the insulating wire is easily flawed by the above described mechanism of generation of processing flaws. Preferably, the insulating coating has the tensile strength of 14 to 25 $kg/mm^2$ and the Young's modulus of 300 to 600 $kg/mm^2$.

The resistance to flaw of the insulating coating is further improved, when the insulating coating has a bonding strength between the conductor and the coating of at least 40 g/mm, and a coefficient of static friction against a stainless steel wire of not larger than 0.10. Preferably, the bonding strength is from 40 to 80 g/mm, and the coefficient of static friction against a stainless steel wire is from 0.04 to 0.08.

As a material of the insulating coating, any material that is coated and baked around the conductor to form the insulating coating can be used, insofar as the above properties are satisfied. Among the materials, polyamideimide resins, polyimide resins and aromatic polyamide resins which may optionally contain organic or inorganic fillers are preferred, since they can form a coating layer having excellent mechanical properties. More preferably, the polyamideimide, polyimide and aromatic polyamide resins further comprising the following repeating units to improve the strength or optionally containing the organic or inorganic filler are used:

(1)

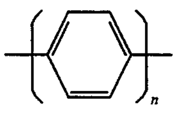

wherein n is an integer of at least 1 (one), (2)

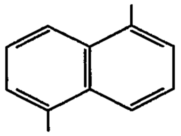

(3)

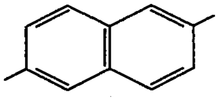

(4)

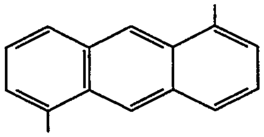

(5)

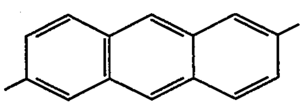

(6)

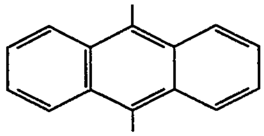

(7)

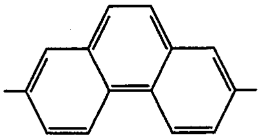

(8)

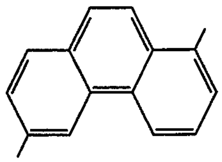

(9)

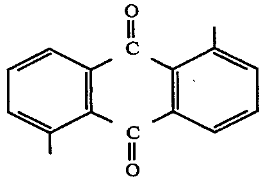

(10)

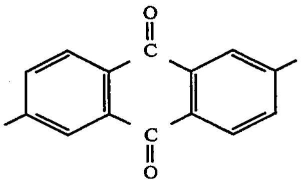

(11)

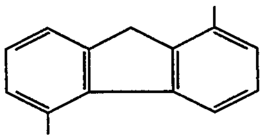

-continued (12)

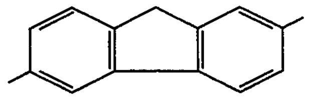

(13)

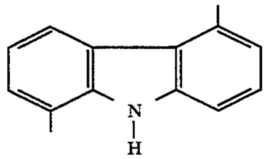

(14)

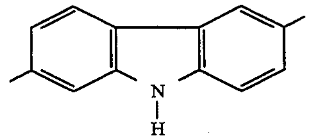

(15)

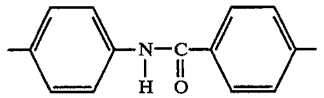

Among them, the polyamide imide resin paint can be prepared by any one of per se conventional methods, for example, (i) by polymerizing substantially stoichiometric amounts of a diisocyanate component and an acid component, (ii) by reacting an diamine component and an acid component and polymerizing the reaction product and a substantially stoichiometric amount of a diisocyanate compound, or (iii) by polymerizing an acid component including an acid chloride and a diamine component.

To improve the strength of insulating coating by incorporating at least one of the above repeating units (1) to (15) in the polyamideimide resin in the above method (i), an aromatic diisocyanate having such structure in the molecule is used as the diisocyanate component.

Such aromatic diisocyanates include oligo(p-phenylene) type diisocyanate in which benzene rings are bonded at para positions, for example, p-phenylenediisocyanate, biphenyl-4,4'-diisocyanate, terphenyl-4,4''-diisocyanate, etc. which may have a substituent such as a halogen atom, an alkyl group or an alkoxyl group on their basic structures.

Examples of the polynuclear aromatic diisocyanate are naphthalene-1,5-diisocyanate, naphthalene-2,6-diisocyanate, anthracene- 1,5-diisocyanate, anthracene-2,6-diisocyanate, anthracene-9,10-diisocyanate, phenanthrene-2,7-diisocyanate, phenanthrene- 1,6-diisocyanate, anthraquinone- 1,5-diisocyanate, anthraquinone-2,6-diisocyanate, fluorene-1,5-diisocyanate, fluorene-2,6-diisocyanate, carbazole-1,5-diisocyanate, carbazole-2,6-diisocyanate, etc. which may have a substituent such as a halogen atom, an alkyl group or an alkoxyl group on their basic structures.

Further example is benzanilide-4,4'-diisocyanate which may have a substituent such as a halogen atom, an alkyl group or an alkoxyl group on its basic structure.

The above diisocyanate compounds may be used independently or in the form of a mixture thereof.

In the production method (i), when the above aromatic diisocyanate is used as a sole diisocyanate component, the formed insulating coating may have insufficient flexibility. To avoid this, it is preferable to use the above aromatic diisocyanate together with a diisocyanate which can impart flexibility to the coating so as to balance the strength and flexibility of the coating.

Examples of the diisocyanate which can impart flexibility to the coating are diphenylmethane-4,4'-diisocyanate, diphenyl-methane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, m-xylylenediisocyanate, p-xylylenediisocyanate and the like. They may be used independently or in the form of a mixture thereof.

Examples of the acid component which constitutes the polyamideimide together with the diisocyanate are tribasic acids such as trimellitic acid, trimellitic anhydride, trimellityl chloride or derivatives of trimellitic acid.

A part of the tribasic acid component may be replaced with a tetracarboxylic anhydride or a dibasic acid, for example, pyromellitic dianhydride, biphenyltetracarboxylic dianhydride, benzophenonetetracarboxylic dianhydride, diphenylsulfonetetracarboxylic dianhydride, terephthalic acid, isophthalic acid, sulfoterephthalic acid, dicitric acid, 2,5-thiophenedicarboxylic acid, 4,5-phenanthrenedicarboxylic acid, benzophenone-4,4'-dicarboxylic acid, phthaldiimidedicarboxylic acid, biphenyldicarboxylic acid, 2,6-naphthalenedicarboxylic acid, diphenylsulfone-4,4'-dicarboxylic acid, adipic acid, and the like.

To improve the strength of insulating coating by incorporating at least one of the above repeating units (1) to (15) in the polyamideimide resin in the above method (ii), an aromatic diamine having such structure in the molecule is used as the diamine component.

Such aromatic diamine include oligo(p-phenylene) type diamine in which benzene rings are bonded at para positions, for example, p-phenylenediamine, 4,4'-diaminobiphenyl, 4,4''-diaminoterphenyl, etc. which may have a substituent such as a halogen atom, an alkyl group or an alkoxyl group on their basic structures.

Examples of polynuclear diamine are 1,5-diaminonaphthalene, 2,6-diaminonaphthalene, 1,5-diaminoanthracene, 2,6-diaminoanthracene, 9,10-diaminoanthracene, 2,7-diaminophenanthrene, 1,6-diaminophenanthrene, 1,5-diaminoanthraquinone, 2,6-diaminoanthraquinone, 1,5-diaminofluorene, 2,6-diaminofluorene, 1,5-diaminocarbazole, 2,6-diaminocarbazole, etc. which may have a substituent such as a halogen atom, an alkyl group or an alkoxyl group on their basic structures.

Further example is 4,4'-diaminobenzanilide which may have a substituent such as a halogen atom, an alkyl group or an alkoxyl group on its basic structure.

The above diamine compounds may be used independently or in the form of a mixture thereof.

In the production method (ii), when the above aromatic diamine is used as a sole diamine component, the formed insulating coating may have insufficient flexibility. To avoid this, it is preferable to use the above aromatic diamine together with a diamine which can impart flexibility to the coating so as to balance the strength and flexibility of the coating.

Examples of the diamine which can impart flexibility to the coating are m-phenylenediamine, diaminodiphenylmethane, diaminodiphenylsulfone, diaminodiphenylsulfide, diaminodiphenylpropane, diaminodiphenylether, diaminobenzophenone, diaminodiphenylhexafluoropropane, 4,4'-bis(4-aminophenoxy)-biphenyl, 4,4'-[bis(4-aminophenoxy)biphenyl]ether, 4,4'-[bis(4-aminophenoxy)biphenyl]methane, 4,4'-[bis(4-aminophenoxy)bipheny]sulfone, 4,4'-[bis(4-aminophenoxy)biphenyl]propane, and the like. They may be used independently or in the form of a mixture thereof.

As the acid and diisocyanate components, those exemplified in connection with the method (i) can be used.

As the diamine component used in the production method (iii), those exemplified in connection with the method (ii) can be used. In the same way, the above diamine is used to introduce the repeating units of the formulas (1) to (15) in the polyamideimide resin so as to improve the strength of the coating, and the diamine which can impart the flexibility to the coating can be used in combination so as to balance the strength and flexibility of the coating.

As the acid chloride to be polymerized with the above diamine component in the production method (iii), trimellityl chloride and its derivatives are exemplified. Further, terephthaloyl chloride or isophthaloyl chloride may be used.

Among the insulating coating paints, the polyimide paint can be prepared by a per se conventional method comprising polymerizing substantially stoichiometric amounts of the diamine component and the acid component including a tetracarboxylic anhydride.

To improve the strength of insulating coating by incorporating at least one of the above repeating units (1) to (15) in the polyimide resin, there can be used an aromatic diamine having the structure of one of the formulas (1) to (15) which may have a substituent such as a halogen atom, an alkyl group or an alkoxyl group on its basic structure as exemplified in connection with the method (ii) for producing the polyamideimide resin. Such diamine can be used independently or in the form of a mixture thereof.

It is preferable to use such aromatic diamine together with the above exemplified diamine which imparts flexibility to the coating so as to balance the strength and flexibility of the coating.

Examples of the acid component which constitutes the polyimide resin together with the diamine component are tetracarboxylic dianhydrides such as pyromellitic dianhydride, biphenyltetracarboxylic dianhydride, benzophenone-3,3',4,4'-tetracarboxylic dianhydride, diphenylsulfone-3,3',4,4'-tetracarboxylic dianhydride, diphenylmethane-3,3',4,4'-tetracarboxylic dianhydride, diphenylpropane-3,3',4,4'-tetracarboxylic dianhydride, diphenylhexafluoropropane-3,3',4,4'-tetracarboxylic dianhydride, benzene-1,2,3,4-tetracarboxylic dianhydride, naphthalene-2,3,5,7-tetracarboxylic dianhydride, naphthalene-1,2,5,6-tetracarboxylic dianhydride, and derivatives thereof. They may be used independently or in the form of a mixture.

Among the above acid components, pyromellitic dianhydride, biphenyltetracarboxylic dianhydride and their derivatives are preferably used in view of their easy availability.

Among the insulating coating resins, the aromatic polyamide resin can be prepared by a per se conventional method comprising polymerizing substantially stoichiometric amounts of a diamine component and an acid component containing an acid chloride.

To improve the strength of insulating coating by incorporating one or more of the above repeating units (1) to (15) in the polyamide resin, an aromatic acid chloride having the structure of one of the formulas (1) to (15) in the molecule is used.

Examples of such aromatic acid chloride are terephthaloyl dichloride, biphenyl-4,4′-dicarbonyl dichloride, terphenyl-4,4″-dicarbonyl dichloride, naphthalene-1,5-dicarbonyl dichloride and the like. They may be used independently or in the form of a mixture thereof.

In this production method, when the above aromatic acid chloride is used as a sole acid chloride component, the formed insulating coating may have insufficient flexibility. To avoid this, it is preferable to use the above aromatic acid chloride together with an acid chloride which can impart flexibility to the coating so as to balance the strength and flexibility of the coating, such as isophthaloyl dichloride.

As the diamine component which constitutes the aromatic polyamide resin together with the above acid chloride, those exemplified in connection with the production method (ii) for producing the polyamideimide resin can be used. In the same way, the above diamine is used to introduce the repeating units of the formulas (1) to (15) in the polyamide resin so as to improve the strength of the coating, and the diamine which can impart the flexibility to the coating can be used in combination so as to balance the strength and flexibility of the coating.

As the filler which may be compounded in the coating paint to increase the strength of the insulating coating, any of the known organic or inorganic fillers can be used. Among them, whiskers of potassium titanate, aluminum borate, silicon carbide, silicon nitride, calcium sulfate, magnesium borate and the like are preferred.

A size of the whisker is not critical in the present invention. Preferably, a fiber diameter of the whisker is not larger than 2 μm, and a fiber length is not longer than 250 μm. When either the fiber diameter or the fiber length exceeds the above maximum value, the insulating coating loses flexibility so that the tensile strength and Young's modulus are decreased to the level lower than the above defined range, whereby the insulating coating is easily flawed.

As the fiber diameter of the whisker is smaller, the tensile strength of the insulating coating increases. Therefore, more preferably, the fiber diameter of the whisker is not larger than 1.5 μm, and the fiber length is not longer than 200 μm.

An amount of the whisker is not limited. Preferably, it is from 5 to 90 parts by weight per 100 parts by weight of the non-volatile components in the paint, namely the resin material except the solvent. When the amount of whisker is less than 5 parts by weight, the improvement of Young's modulus of the insulating coating is insufficient and the coating is easily flawed, while it exceeds 90 parts by weight, the elongation of the coating is considerably decreased, and then the flexibility of the coating is greatly deteriorated. The amount of whisker is preferably from 10 to 80 parts by weight, in particular, from 15 to 50 parts by weight per 100 parts by weight of the non-volatile components.

If desired, the coating paint used in the present invention may contain any of conventionally used additives such as a pigment, a dye, a lubricant and the like.

The insulated wire of the present invention can be produced by coating the insulating coating paint on the conductor and then baking it to form the insulating coating.

A thickness of the insulating coating is not limited and may be the same thickness as the conventional insulated wire and selected according to a diameter of the conductor or the actual uses of the insulated wire.

The insulating coating of the present invention may be formed directly on the bare conductor, or on other insulating coating which is formed on the conductor.

The other insulating coating acts as a primer coating and is preferably made of a material which has good adhesion both to the insulating coating of the present invention and the conductor.

As the primer coating material, any of the conventionally used insulating materials such as polyurethane, polyester, polyesterimide, and the like may be used.

A thickness of the primer coating is not critical.

In addition, over the insulating coating, a surface-lubricating layer may be provided to impart the lubricity to the surface of the insulated wire.

As the surface-lubricating layer, while a coating film of a paraffin such as a liquid paraffin, solid paraffin, etc. may be used, a surface-lubricating layer formed by binding a lubricant such as a wax, polyethylene, a fluororesin or a silicone resin with a binder resin is preferably used.

PREFERRED EMBODIMENTS OF THE INVENTION

The present invention will be illustrated by the following examples, which do not limit the scope of the present invention in any way.

EXAMPLE 1

A polyamideimide base paint was prepared by polymerizing the following acid component and diisocyanate component:

Acid Component

Trimellitic anhydride (hereinafter referred to as "TMA"): 1.0 mole

Diisocyanate component p-Phenylenediisocyanate (hereinafter referred to as "PPDI"): 0.4 mole Naphthalene-1,5-diisocyanate (hereinafter referred to as "NDI"): 0.2mole Diphenylmethanediisocyanate (hereinafter referred to as "MDI"): 0.4 mole The paint was applied on a peripheral surface of a copper conductor having a diameter of 1.0 mm and baked by a conventional method to produce an insulated wire having an insulating coating with a thickness of 35 μm.

EXAMPLE 2

A polyamideimide base paint was prepared by reacting the following acid component and diisocyanate component:

Acid component

TMA: 1.0 mole

Diisocyanate component 3,3′-Dimethylbiphenyl-4,4′-diisocyanate (hereinafter referred to as "TODI"): 0.6 mole MDI: 0.4 mole In the same manner as in Example 1 but using this polyamideimide base paint, an insulated wire consisting of a copper conductor having a diameter of 1.0 mm and an insulating coating with a thickness of 35 μm formed on the peripheral surface of the conductor was produced.

EXAMPLE 3

A polyamideimide base paint was prepared by reacting the following acid component and diamine component to obtain a dicarboxylic acid and then polymerizing the dicarboxylic acid and the following diisocyanate component:

Acid component
TMA: 1.0 mole
Diamine Component
3,3′-Dimethyl-4,4′-diaminobiphenyl (hereinafter referred to as "DBRB"): 0.35 mole
4,4-Diaminodiphenylether (hereinafter referred to as "DDE"): 0.15 mole
Diisocyanate component
PPDI: 0.35 mole
MDI: 0.15 mole In the same manner as in Example 1 but using this polyamideimide base paint, an insulated wire consisting of a copper conductor having a diameter of 1.0 mm and an insulating coating with a thickness of 35 μm formed on the peripheral surface of the conductor was produced.

Comparative Example 1

In the same manner as in Example 1 except that 1.0 mole of MDI was used as the diamine component, a polyamideimide base paint was prepared, and using this paint, an insulated wire consisting of a copper conductor having a diameter of 1.0 mm and an insulating coating with a thickness of 35 μm formed on the peripheral surface of the conductor was produced.

EXAMPLE 4

A polyimide base paint was prepared by polymerizing the following acid component and diamine component:

Acid component
Pyromellitic anhydride (hereinafter referred to as "PMDA"): 0.5 mole
Diamine Component
4,4′-Diaminobenzanilide (hereinafter referred to as "DABAN"): 0.15 mole
p-Phenylenediamine (hereinafter referred to as "p-PDA"): 0.15 mole
4.4′-[Bis(4-aminophenoxy)phenyl]propane (hereinafter referred to as "BAPP"): 0.2mole The paint was applied on a peripheral surface of a copper conductor having a diameter of 1.0 mm and baked by a conventional method to produce an insulated wire having an insulating coating with a thickness of 35 μm.

EXAMPLE 5

In the same manner as in Example 3 except that 0.25 mole of PMDA and 0.25 mole of 3,3′,4,4′-biphenyltetracarboxyl dianhydride (hereinafter referred to as "s-BPDA") as the acid components and 0.2 mole of p-PDA, 0.1 mole of BAPP and 0.2 mole of DDE as the diamine components, a polyamide base paint was prepared, and using this paint, an insulated wire consisting of a copper conductor having a diameter of 1.0 mm and an insulating coating with a thickness of 35 μm formed on the peripheral surface of the conductor was produced.

Comparative Example 2

In the same manner as in Example 3 except that 0.1 mole of DABAN, 0.2: mole of DDE and 0.2 mole of BAPP as the diamine components, a polyamide base paint was prepared, and using this paint, an insulated wire consisting of a copper conductor having a diameter of 1.0 mm and an insulating coating with a thickness of 35 μm formed on the peripheral surface of the conductor was produced.

EXAMPLE 6

An aromatic polyamide base paint was prepared by polymerizing the following acid component and diamine component:

Acid component
Terephthaloyl dichloride: 0.6 mole
Isophthaloyl dichloride: 0.4 mole
Diamine component
DDE: 0.75 mole
p-PDA: 0.25 mole The paint was applied on a peripheral surface of a copper conductor having a diameter of 1.0 mm and baked by a conventional method to produce an insulated wire having an insulating coating with a thickness of 35 μm.

EXAMPLE 7

To the polyamideimide based paint prepared in Comparative Example 1, 10 parts by weight, per 100 parts by weight of the resin in the paint, of potassium titanate whisker (Tismo D (trade name) manufactured by Otsuka Chemical Co., Ltd. having a fiber diameter of 1.0 μm and a fiber length of 50 μm) was added and mixed to prepare a paint. Using this paint, an insulated wire was produced in the same manner as in Comparative Example 1.

EXAMPLE 8

On a peripheral surface of a copper conductor having a diameter of 1.0 mm, a commercially sold polyamideimide paint comprising diphenylmethane-4,4′-diisocyanate and TMA was coated and baked to form a primer coating having a thickness of 8 μm.

On the primer coating, the same polyamideimide base paint as that used in Example 1 was coated and baked by a conventional method to form an insulating coating having a thickness of 27 μm, whereby an insulated wire was produced.

EXAMPLE 9

An insulated wire was produced in the same manner as in Example 8 except that, on the surface of the insulating coating of the insulated wire produced in Example 8, a water-soluble lubricating paint comprising a wax and a binder resin was coated and baked by a conventional method to form a surface-lubricating layer.

With each of the insulated wires produced in Examples and Comparative Examples, the following properties were measured:

Tensile Strength and Young's Modulus

From the insulated wire, the copper conductor is removed by etching to leave the insulating coating (a length of 6 cm). The insulating coating is subjected to tensile tests using a tensile tester with a chuck distance of 3 cm at a pulling rate of 1 mm/min. From the resulting S—S curve, a Young's modulus (kg/mm$^2$) and a tensile strength (kg/mm$^2$) are calculated.

Adhesion Strength

Along a length of the insulating coating, two cut lines each having a length of 2 cm are made at a distance of 0.5 mm and an edge of the insulating coating between the two cut lines is peeled off with a forceps. Then, it is subjected to the 180° peeling test between the insulating coating and the conductor using a thermal-mechanical analyzer (TMA) (THERMAL-ECHANCAL ANALYSIS manufactured by Seiko Electronics Co., Ltd.) to measure an adhesion force (g/mm).

Coefficient of Static Friction Against Stainless Steel Wire

The insulated wire and a stainless steel wire are perpendicularly crossed and a load of 1 kg is applied to one end of the stainless steel wire. Then, a coefficient of static friction is measured.

Flexibility

The insulated wire is contacted to a round rod having a diameter of 1 mm and bent around the outer periphery of the rod, and the condition of insulating coating is observed to find cracking or peeling off of the insulating coating. When no irregularity is found, the insulating coating is ranked "Good", while when any irregularity is found, the insulating coating is ranked "Bad".

Damage Test Under Stainless Steel Wire Loading

The insulated wire and a stainless steel wire are perpendicularly crossed and the stainless steel wire is pulled with applying various loads to the stainless steel wire. The minimum load at which the insulating coating is flawed is recorded.

Leakage Current After Winding

The insulated wire is wound in a coil form using a winding machine which is actually used for winding a wire, and dipped in a 3 % saline solution together with a counter electrode. By applying a voltage of 3 V between the coil as a negative electrode and the counter electrode, a leakage current is measured to evaluate an extent of flaw which reaches the conductor of the insulated wire wound in the coil form.

The results are shown in the Table.

kg/mm$^2$, they were easily flawed in view of the results of leakage current after winding.

In contrast therewith, since the insulating coatings of the insulated wires of the present invention produced in Examples 1 to 9 had the tensile strength of at least 13 kg/mm$^2$ and the Young's modulus of at least 270 kg/mm$^2$, they were hardly flawed irrespective of the kinds of the resins of insulating coatings.

From the results of Examples 8 and 9 in which the primer coatings were formed to improve the adhesion strength, it was understood that, when the adhesion strength was 40 g/mm or larger, the insulating coatings were less flawed.

From the results of Example 9 in which the surface-lubricating layer was formed, it was understood that, when the coefficient of static friction was 0.10 or less, the insulating coating was much less flawed.

EXAMPLE 10

The polyamideimide base paint prepared in Example 2 was coated around a peripheral surface of a copper conductor having a diameter of 1.33 mm and baked by a conventional method. Then, the water-soluble lubricating paint used in Example 9 was coated on the insulating layer and baked to produce an insulated wire having a coating thickness of 43 μm , 32 μm , 28 μm or 20 μm.

For comparison, the polyamideimide base paint prepared in Comparative Example 1 was coated around a peripheral surface of a copper conductor having a diameter of 1.33 mm and baked. Then, the water-soluble lubricating paint used in Example 9 was coated on the insulating coating and based to produce an insulated wire having a coating thickness of 43 μm.

Using each of the produced insulated wires, a stator coil was assembled using a winding simulator. Then the leakage current was measured by dipping the stator coil as a positive electrode in a 5 % saline solution together with a counter electrode as a negative electrode, and applying a voltage of 12 V between them. The leakage current was measured after 30 seconds from the start of the voltage application.

The results are shown in the FIGURE.

When the thicknesses of insulating coatings were the same (43 μm), the leakage current of the insulated wire of the present invention was about one third (1/3) of that of the conventional insulated wire.

TABLE

| Example No. | Young's Modulus (kg/mm$^2$) | Tensile strength (kg/mm$^2$) | Adhesion strength (g/mm) | Coefficient of static friction | Flexibility | Damage load (kg) | Leakage current (mA) |
|---|---|---|---|---|---|---|---|
| 1 | 300 | 15.0 | 32 | 0.13 | Good | 8.5 | 31 |
| 2 | 300 | 14.9 | 31 | 0.13 | Good | 8.5 | 29 |
| 3 | 310 | 14.7 | 28 | 0.14 | Good | 8.5 | 29 |
| C.1 | 200 | 11.5 | 30 | 0.13 | Good | 7.0 | 62 |
| 4 | 300 | 15.5 | 30 | 0.13 | Good | 8.5 | 32 |
| 5 | 290 | 14.8 | 28 | 0.14 | Good | 8.5 | 35 |
| C.2 | 250 | 12.3 | 32 | 0.13 | Good | 7.0 | 59 |
| 6 | 510 | 18.0 | 22 | 0.13 | Good | 10.0 | 26 |
| 7 | 280 | 13.5 | 30 | 0.14 | Good | 8.0 | 40 |
| 8 | 290 | 14.5 | 43 | 0.13 | Good | 9.0 | 24 |
| 9 | 290 | 14.5 | 43 | 0.08 | Good | 9.5 | 21 |

From the above results, since the insulating coatings of the insulated wires produced in Comparative Examples 1 and 2 had the tensile strength of less than 13 kg/mm$^2$ and the Young's modulus of less than 270

Further, the insulating coating having the thickness of 20 μm had the smaller leakage current than the conventional insulated wire having the insulating coating thickness of 43 μm.

What is claimed is:

1. An insulated wire comprising a conductor and an insulating coating which has a tensile strength of at least 13 $kg/mm^2$ and a Young's modulus of at least 270 $kg/mm^2$.

2. The insulated wire according to claim 1, wherein said insulating coating has a tensile strength of 14 to 25 $kg/mm^2$ and a Young's modulus of 300 to 600 $kg/mm^2$.

3. The insulated wire according to claim 1, wherein an adhesion force between said insulating coating and said conductor is at least 40 g/mm.

4. The insulated wire according to claim 3, wherein said adhesion force is from 40 to 80 g/mm.

5. The insulated wire according to claim 1, wherein a coefficient of static friction of said insulating coating against a stainless steel wire is at most 0.10.

6. The insulated wire according to claim 5, wherein said coefficient of static friction is from 0.04 to 0.08.

7. The insulated wire according to claim 1, wherein said insulating coating comprises at least one resin selected from the group consisting of polyamideimide resins, polyimide resins and aromatic polyamide resins.

8. The insulated wire according to claim 7, wherein said at least one resin comprises a repeating unit of the formula:

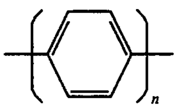

(1)

wherein n is an integer of at least 1.

9. The insulated wire according to claim 7, wherein said at least one resin comprises a repeating unit of the formula:

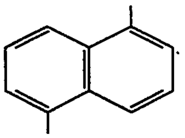

(2)

10. The insulated wire according to claim 7, wherein said at least one resin comprises a repeating unit of the formula:

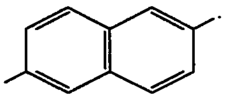

(3)

11. The insulated wire according to claim 7, wherein said at least one resin comprises a repeating unit of the formula:

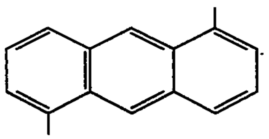

(4)

12. The insulated wire according to claim 7, wherein said at least one resin comprises a repeating unit of the formula:

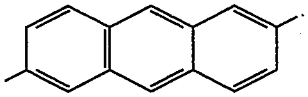

(5)

13. The insulated wire according to claim 7, wherein said at least one resin comprises a repeating unit of the formula:

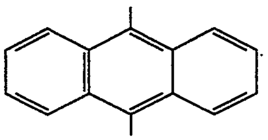

(6)

14. The insulated wire according to claim 7, wherein said at least one resin comprises a repeating unit of the formula:

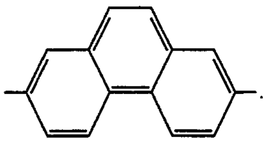

(7)

15. The insulated wire according to claim 7, wherein said at least one resin comprises a repeating unit of the formula:

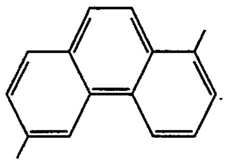

(8)

16. The insulated wire according to claim 7, wherein said at least one resin comprises a repeating unit of the formula:

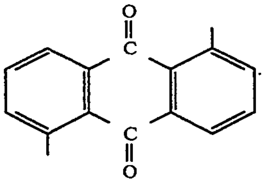

(9)

17. The insulated wire according to claim 7, wherein said at least one resin comprises a repeating unit of the formula:

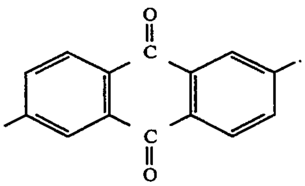

(10)

18. The insulated wire according to claim 7, wherein said at least one resin comprises a repeating unit of the formula:

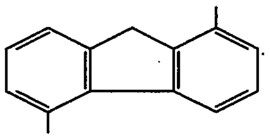

(11)

19. The insulated wire according to claim 7, wherein said at least one resin comprises a repeating unit of the formula:

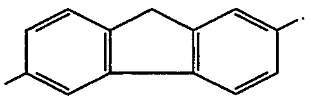

(12)

20. The insulated wire according to claim 7, wherein said at least one resin comprises a repeating unit of the formula:

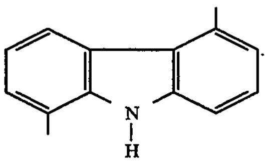

(13)

21. The insulated wire according to claim 7, wherein said at least one resin comprises a repeating unit of the formula:

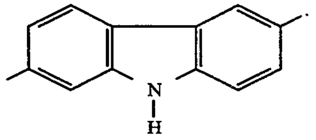

(14)

22. The insulated wire according to claim 7, wherein said at least one resin comprises a repeating unit of the formula:

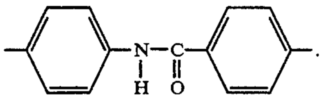

(15)

23. The insulated wire according to claim 1, wherein said insulating coating contains a filler.

24. The insulated wire according to claim 23, wherein said filler is a whisker of at least one material selected from potassium titanate, aluminum borate, silicon carbide, silicon nitride, calcium sulfate and magnesium borate.

25. The insulated wire according to claim 24, wherein said whisker has a fiber diameter of not larger than 2 μm and a fiber length of not longer than 250 μm.

26. The insulated wire according to claim 24, wherein an amount of said whisker is from 5 to 90 parts by weight per 100 parts by weight is the resin in said insulating coating.

* * * * *